United States Patent
Lee et al.

(10) Patent No.: US 7,910,259 B2
(45) Date of Patent: Mar. 22, 2011

(54) ANODE FOR FUEL CELL, MANUFACTURING METHOD THEREOF, AND FUEL CELL INCLUDING THE SAME

(75) Inventors: Seol-ah Lee, Yongin-si (KR); Seung-jae Lee, Seongnam-si (KR); Chan-ho Pak, Seoul (KR); Ji-rae Kim, Seoul (KR); Dae-jong Yoo, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1328 days.

(21) Appl. No.: 11/445,340

(22) Filed: Jun. 2, 2006

(65) Prior Publication Data

US 2007/0122690 A1 May 31, 2007

(30) Foreign Application Priority Data

Nov. 26, 2005 (KR) .................. 10-2005-0113853

(51) Int. Cl.
*H01M 8/14* (2006.01)
(52) U.S. Cl. ........ 429/474; 429/481; 429/482; 429/521; 429/523; 429/524; 429/535
(58) Field of Classification Search .............. 429/27, 429/40, 42, 474, 481, 482, 521, 523, 524, 429/535
See application file for complete search history.

(56) References Cited

U.S. PATENT DOCUMENTS

| | | | |
|---|---|---|---|
| 6,881,511 B1 | 4/2005 | Tosco et al. | |
| 2004/0151969 A1* | 8/2004 | Joos et al. | 429/35 |
| 2004/0197638 A1* | 10/2004 | McElrath et al. | 429/44 |
| 2005/0069754 A1* | 3/2005 | Kim et al. | 429/42 |
| 2006/0019825 A2* | 1/2006 | Devenney et al. | 502/313 |
| 2006/0039848 A1* | 2/2006 | Matarredona et al. | 423/447.1 |
| 2006/0137817 A1* | 6/2006 | Ma et al. | 156/296 |

(Continued)

FOREIGN PATENT DOCUMENTS

CN 1180249 A 4/1998

(Continued)

OTHER PUBLICATIONS

Japanese Office Action issued Dec. 15, 2009, in corresponding Japanese Patent Application No. 2006-155445.

*Primary Examiner* — Patrick Ryan
*Assistant Examiner* — Ben Lewis
(74) *Attorney, Agent, or Firm* — Lee & Morse, P.C.

(57) ABSTRACT

A method of manufacturing an anode for a fuel cell including: performing an acid treatment for a carbon-based compound; washing the resultant obtained from the acid treatment with water and then performing a freeze-drying (lyophilization) process; forming a microporous diffusion layer by dispersing the lyophilized resultant in a solvent, coating the dispersed resultant on a porous carbon support, and drying; and forming a catalyst layer on top of the microporous diffusion layer, an anode for a fuel cell obtained according to the method herein, and a fuel cell using the same. An anode having improved efficiency on liquid fuel diffusion can be obtained when using the fuel diffusion layer including the microporous diffusion layer formed of the carbon-based compounds obtained after an acid treatment and a freeze-drying process according to the present invention. A fuel cell having improved performance can be manufactured by using such an anode.

37 Claims, 5 Drawing Sheets

U.S. PATENT DOCUMENTS

2007/0122690 A1    5/2007    Lee et al.

FOREIGN PATENT DOCUMENTS

| | | |
|---|---|---|
| CN | 1411089 A | 4/2003 |
| CN | 1658422 A | 8/2005 |
| CN | 100521316 C | 7/2009 |
| JP | 2005-108837 | 4/2005 |
| JP | 2005-267902 | 9/2005 |
| JP | P2005-293910 | 10/2005 |

\* cited by examiner

ANODE FOR FUEL CELL, MANUFACTURING METHOD THEREOF, AND FUEL CELL INCLUDING THE SAME

CROSS-REFERENCE TO RELATED PATENT APPLICATIONS

This application claims the benefit of Korean Patent Application No. 2005-113853, filed Nov. 26, 2005, in the Korean Intellectual Property Office, the disclosure of which is incorporated herein by reference.

BACKGROUND OF THE INVENTION

1. Field of the Invention

Aspects of the present invention relate to an anode for a fuel cell and a fuel cell including the same, and more particularly, to an anode which is a fuel diffusion electrode having improved performance by increasing diffusion of liquid fuel, a manufacturing method thereof, and a full cell including the same.

2. Description of the Related Art

A fuel cell generates electricity and heat at the same time by electrochemically reacting a fuel gas such as hydrogen or methanol and an oxidizing gas such as air on a catalyst such as platinum. Here, the electrodes in which the fuel gas and the oxidizing gas are supplied are called an anode and a cathode, respectively.

A fuel diffusion electrode forming the anode of a fuel cell includes one or more porous layers formed of carbon-based powder as a main component and a carbon support (carbon paper or carbon cloth) having pores to stack the one or more porous layers on a lower portion thereof.

However, the above fuel diffusion electrode has a low absorption rate of water, thereby obstructing diffusion of liquid fuel and reducing an efficiency of the fuel cell.

In order to overcome the above-mentioned matters, U.S. Pat. No. 6,881,511 discloses a gas diffusion electrode including a shielding layer and an active layer, the shielding layer and/or the active layer including at least one carbon product and a bonding agent in which at least one organic group is attached.

However, even when the gas diffusion electrode is used, diffusion of liquid fuel can not be increased to a satisfactory level and thus, there is much to be improved.

SUMMARY OF THE INVENTION

Aspects of the present invention provide a fuel diffusion electrode to improve efficiency of diffusion of liquid fuel in a fuel cell, a method of manufacturing thereof, and a fuel cell having improved performance using the same.

According to an aspect of the present invention, there is provided a method of manufacturing an anode for a fuel cell including: performing an acid treatment for a carbon-based compound; washing the resultant obtained from the acid treatment with water and then performing a freeze-drying process; forming a microporous diffusion layer by dispersing the lyophilized resultant in a solvent, coating the dispersed resultant on a porous carbon support, and drying; and forming a catalyst layer on the top of the microporous diffusion layer.

According to another aspect of the present invention, there is provided an anode for a fuel cell which is formed of a fuel diffusion layer and a catalyst layer including: a microporous diffusion layer formed of a carbon-based compound in which the fuel diffusion layer is formed on a porous carbon support and the element analysis values for the carbon-based compounds of the microporous diffusion layer at the acceleration voltage of 20 keV measured using an energy dispersive spectrometer (EDS) is 90.36±2.00 percent by weight for carbon and 9.64±2.00 percent by weight for oxygen. While not required in all aspects, the microporous diffusion layer may be formed on an upper surface of the porous carbon support.

According to another aspect of the present invention, there is provided a fuel cell having an anode described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 5:
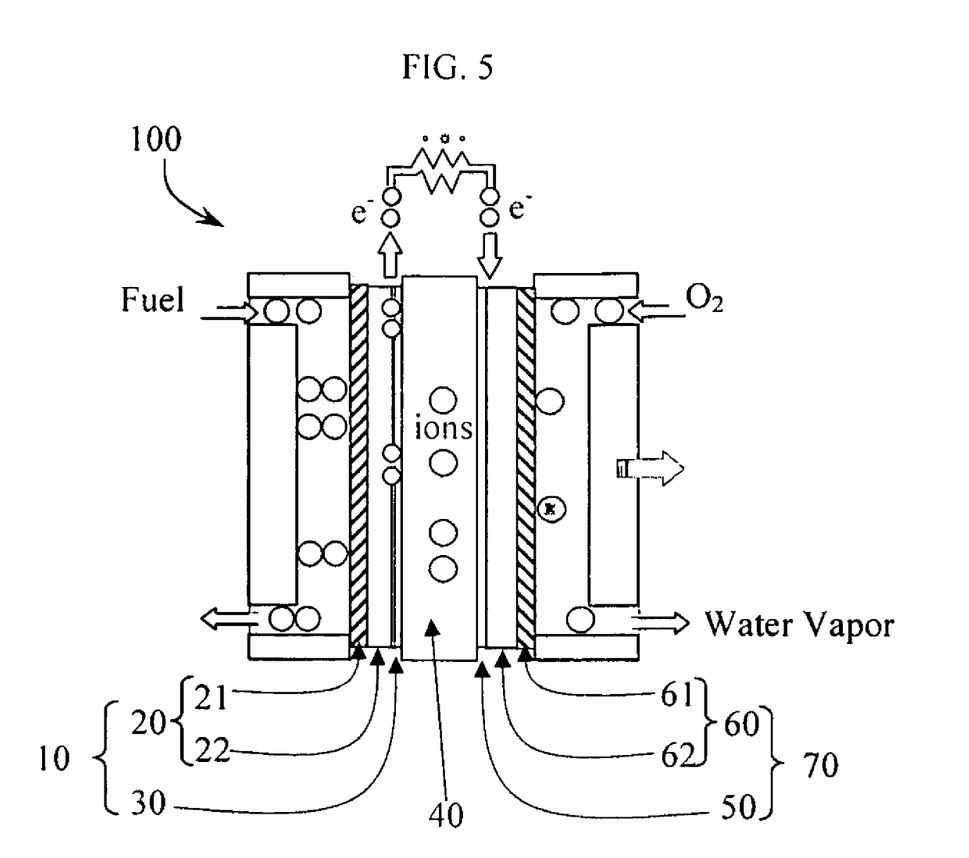
FIG. 5 is a schematic diagram of a fuel cell showing diffusion layers, catalyst layers, electrodes, and an electrolyte membrane according to an embodiment of the present invention.

Referring to FIG. 5, an anode 10, according to an aspect of the present invention, is formed of a fuel diffusion layer 20 and a catalyst layer 30 and the fuel diffusion layer 20 includes a porous carbon support 21 and a microporous diffusion layer 22 formed on the porous carbon support. The microporous diffusion layer 22 is formed of at least one carbon-based compound obtained by an acid treatment and a freeze-drying process according to aspects of the present invention.

According to an aspect of the present invention, a method of manufacturing the fuel diffusion layer 20 is as follows.

Firstly, an acid treatment is performed for carbon-based compounds. An acid used in an aqueous solution in the acid treatment is not particularly restricted and may be at least one selected from the group consisting of nitric acid, sulfuric acid, hydrochloric acid, and acetic acid. A concentration of the aqueous acid solution may be in a range of 0.1 to 5 M. Generally, when the concentration is below this range, producing surface constituents enabling a hydrophilic action is decreased and when the concentration is above this range, an operating ability is insufficient due to a strong acid.

An amount of the carbon-based compounds may be 0.01 to 50 parts by weight based on 100 parts by weight of the aqueous acid solution. Generally, when the amount of the carbon-based compounds is below this range, a yield is decreased as the amount of the carbon versus aqueous acid solution is small. Generally, when the amount of the carbon-based compounds is above this range, the carbon joined with the aqueous acid solution does not adequately react.

A time for the acid treatment varies according to the concentration of the aqueous acid solution and the kinds of acid and may be in a range of 1 minute to 200 hours. Generally, when the time for the acid treatment is below this range, an efficiency of the acid treatment for the carbon-based compounds is low. Generally, when the time for the acid treatment is above this range, the carbon itself may be corroded.

Examples of the carbon-based compounds used in an aspect of the present invention include carbon black, graphite, vitreous carbon, activated charcoal, carbon fiber, activated carbon, carbon aerogel, carbon nanotubes, microporous carbon, or a mixture thereof. According to an embodiment of the present invention, carbon black is used and Ketzen black (Akzo Nobel Polymer Chemicals) and vulcan black (Cabot) which can be acquired commercially may be used.

Secondly, the resultant obtained after the acid treatment described above is then washed with water and a freeze-drying process is performed.

The freeze-drying process includes freeze-drying in liquid nitrogen and vacuum drying by adjusting the temperature in a range of −60 to −10° C. with a degree of vacuum below 50 mtorr, particularly $10^{-3}$ to 50 mtorr after the complete freeze-drying in liquid nitrogen.

In the vacuum drying, when the temperature is above −10° C., the solution of the resultant obtained from the acid treatment may tend to melt during the freeze-drying process and thus, in general, the freeze-drying process may not be performed. Generally, vacuum drying proceeds when the degree of vacuum is below 50 mtorr but when the degree of vacuum is above 50 mtorr, the freeze-drying process may not be performed.

A time for the freeze-drying process varies according to the temperature, the degree of vacuum, the amount of samples, the size of a reacting container, and the amount of water, however, the freeze-drying process may be performed for 5 to 2000 hours.

Thirdly, the lyophilized carbon-based compound is dispersed in a volatile organic solvent to prepare a composition for forming the microporous diffusion layer and the composition is applied on the porous carbon support 21 and dried to form the microporous diffusion layer 22, thereby completing an anode fuel diffusion layer 20. While not required in all aspects, a thickness of the formed microporous diffusion layer may be 5 to 200 μm. Although the method is described as forming an anode 10, it is understood that the invention is not limited thereto, that is, the method of forming the microporous diffusion layer on the porous carbon support can be used to form an electrode, including a cathode, as shown by numerals 62 and 61, respectively, in FIG. 5.

Examples of the solvent include isopropyl alcohol, acetone, ethanol, and methanol and the amount of the solvent may be 20 to 200 times higher than the standard weight of the lyophilized carbon-based compound. The above drying process may be performed at a room temperature to around 80° C.

While not required in all aspects, the composition for forming the microporous diffusion layer 22, 62 may further include a bonding agent. Here, as a bonding agent, a hydrophilic polymer can be used and the amount of the bonding agent is 1 to 100 parts by weight based on 100 parts by weight of the lyophilized carbon-based compound.

According to an aspect of the present invention, an anode 10 for a fuel cell 100 is manufactured by forming a catalyst layer 30 on the gas diffusion layer 20.

In the process described above, carbon paper and carbon cloth are used in the porous carbon support 21. An amount of the carbon-based compounds applied, that is, an applying amount, with respect to the porous carbon support 21 in the gas diffusion layer 20 may be in a range of 0.1 to 5 mg/cm$^2$. Generally, when the applying amount of the carbon-based compounds is below this range, the thickness of the microporous diffusion layer 22 becomes thinner, thereby decreasing efficiency of fuel diffusion. Generally, when the applying amount of the carbon-based compounds is above this range, the thickness of the microporous diffusion layer 22 becomes thicker, thereby increasing resistance.

In the microporous diffusion layer 22 obtained according to the above process, a pH of a slurry, made of the mixture of 1 g of the carbon-based compounds and 10 cc of deionized water, may be 0.1 to 4.1. It is allowable for the pH of the slurry to be below 0.1 but generally, when the pH of the slurry is above this range, an adequate amount of hydrophilic compounds is lacking.

Examples of the catalyst used when forming the anode catalyst layer 30 include at least one metal selected from the group consisting of platinum (Pt) independently and the group consisting of gold, palladium, rhodium, ruthenium, iridium, tin, nickel, and molybdenum, and platinum-alloy or mixture thereof. According to an embodiment of the present invention, PtRu alloy is used.

Examples of the catalyst used when forming the cathode catalyst layer 50, similarly to the anode catalyst layer 30, include at least one metal selected from the group consisting of platinum (Pt) independently and the group consisting of gold, palladium, rhodium, ruthenium, iridium, tin, nickel, and molybdenum, and platinum-alloy or mixture thereof. According to an embodiment of the present invention, platinum is used.

According to an aspect of the present invention, a fuel cell 100 is manufactured by assembling the anode 10 manufactured as described above, a cathode 70, and an electrolyte membrane 40.

The electrolyte membrane 40 is not particularly restricted and NAFION 115 (manufactured by Dupont) may be used according to an embodiment of the present invention.

According to an aspect of the present invention, the fuel cell 100 described above is a direct methanol fuel cell (DMFC). A structure and manufacturing method of such a fuel cell is not particularly restricted and detailed examples are disclosed in various publications in the literature, therefore further detailed description will be omitted herein.

Aspects of the present invention will be described in greater detail with reference to the following examples. The following examples are for illustrative purposes and are not intended to limit the scope of the invention.

Example 1

5 g of Ketzen black and 1 L of 2M HNO$_3$ were mixed, then stirred for 24 hours and the reactant was washed with deionized water for 3 times.

After the washing was completed, a complete freeze-drying was performed in liquid nitrogen and then, a complete vacuum freeze-drying was performed with a degree of vacuum about 7 mtorr at −50° C. The vacuum freeze-drying process was performed for 48 hours to produce treated Ketzen black.

1 g of Ketzen black treated according to the above process was uniformly dispersed in 75 ml of isopropyl alcohol and was then sprayed on a porous carbon support, which was a carbon paper (SGL plain). Here, an applying amount was 0.5 mg/cm$^2$.

The resultant was dried in a vacuum oven for 2 hours in which the temperature was adjusted to 80° C. to prepare an anode diffusion layer.

A fuel cell was manufactured using the above anode diffusion layer.

In order to form the anode catalyst layer, a platinum ruthenium alloy was dispersed in a solution of ultra-pure distilled water, ethylene glycol, and 20 wt % of NAFION ionomer solution (manufactured by Dupont) to prepare a slurry. The slurry was then coated on a polymer film to form the anode catalyst layer. The anode catalyst layer was formed with a loading of the catalyst of 6 mg/cm$^2$ based on the platinum ruthenium alloy content.

In order to form the cathode catalyst layer, platinum was dispersed in a solution of ultra-pure distilled water, ethylene glycol, and 20 wt % of NAFION ionomer solution (manufactured by Dupont) to prepare a cathode catalyst forming slurry. The slurry was distributed on another polymer film to form the cathode catalyst layer. The cathode catalyst layer was formed with a loading of catalyst of 2 mg/cm$^2$ based on the platinum content.

The manufactured anode catalyst layer and the cathode catalyst layer were disposed on either side of a NAFION 115 sheet serving as an electrolyte membrane, the respective polymer films were peeled off after hot-pressing the catalyst layers to the electrolyte membrane and then exposed surfaces of the anode and cathode catalyst layers were bonded with the anode diffusion layer, and a cathode diffusion layer respectively, to manufacture a unit cell.

Before bonding to the cathode catalyst layer, the cathode diffusion layer was made using vulcan carbon powder which was mixed with polytetrafluoroethylene (PTFE) and isopropyl alcohol, loaded to be 1.5 mg/cm$^2$ on a carbon support, and sintered for 10 minutes in an electric furnace at 350° C.

Example 2

An anode and a fuel cell were manufactured in the same manner as in Example 1, except that a hydrochloric acid was used instead of the nitric acid.

Comparative Example 1

A fuel cell was manufactured in the same manner as in Example 1, except that an anode diffusion layer was manufactured according to the process described below.

1 g of vulcan XC 72R and 1 g of polytetrafluoroethylene (PTFE) were dispersed uniformly in 75 g of isopropyl alcohol and then sprayed on a carbon paper (SGL plain). Here, an applying amount of carbon black was 0.5 mg/cm$^2$.

The resultant was dried in a vacuum oven for 2 hours in which the temperature was adjusted to 80° C. and then sintered at 350° C. to manufacture an anode diffusion layer.

Comparative Example 2

A fuel cell was manufactured in the same manner as in Example 1, except that an anode diffusion layer was manufactured according to the process described below.

5 g of Ketzen black and 1 L of 2M HNO$_3$ were mixed and then stirred for 24 hours and the resultant mixture was washed with deionized water for 3 times. Then, the resultant was dried for 10 hours at 100° C. without performing a freeze-drying process.

1 g of Ketzen black obtained after the acid treatment according to the above process was dispersed uniformly in 75 g of isopropyl alcohol and was sprayed on a carbon paper (SGL plain). Here, the applying amount of Ketzen black was 0.5 mg/cm$^2$.

The resultant sprayed carbon paper was dried in a vacuum oven for 2 hours in which the temperature was adjusted to 80° C. to manufacture the anode diffusion layer.

1 g specimens of Ketzen black prepared according to Example 1 and Comparative Example 2 were each mixed with 10 cc portions of deionized water and stirred to produce respective slurries. Then, using a pH meter, the pH of each slurry was measured and the results are shown in Table 1.

In Table 1, KB* was purchased from Akzo Nobel Polymer Chemicals and used without any treatment. It was included in the table for comparative purposes with Example 1 and Comparative Example 2.

TABLE 1

|  | Slurry pH |
| --- | --- |
| KB* | 10.42 |
| Example 1 | 0.81 |
| Comparative Example 2 | 4.15 |

Element analyses were performed of the Ketzen black prepared according to Example 1 and Comparative Example 2, as well as the untreated Ketzen black (KB*), using an energy dispersive spectrometer (EDS) and the results are shown in Table 2. The conditions of the EDS analyses were as follows: EDS specimens were prepared by forming the treated and untreated Ketzen black into respective pellets at a pressure of 4 tonnes/cm$^2$ each having a thickness greater than 1 mm followed by sampling of at least three sites on each pellet for point analysis. The energy dispersive spectra were measured at an acceleration voltage of 20 keV using an ISIS Model EDS system by Oxford Co., Ltd. attached in a 5600 Model scanning electron microscope (SEM) manufactured by JEOL Co., Ltd.

TABLE 2

|  | Point analysis (parts by weight %) | | Average (parts by weight %) | |
| --- | --- | --- | --- | --- |
|  | Carbon | Oxygen | Carbon | Oxygen |
| KB* | 96.42 | 3.58 | 96.06 | 3.94 |
|  | 96.49 | 3.51 |  |  |
|  | 95.26 | 4.74 |  |  |
| Example 1 | 90.62 | 9.38 | 90.36 | 9.64 |
|  | 90.22 | 9.78 |  |  |
|  | 90.24 | 9.76 |  |  |
| Comparative Example 2 | 92.52 | 7.48 | 92.35 | 7.65 |
|  | 91.88 | 8.12 |  |  |
|  | 92.66 | 7.34 |  |  |

Figure 1:
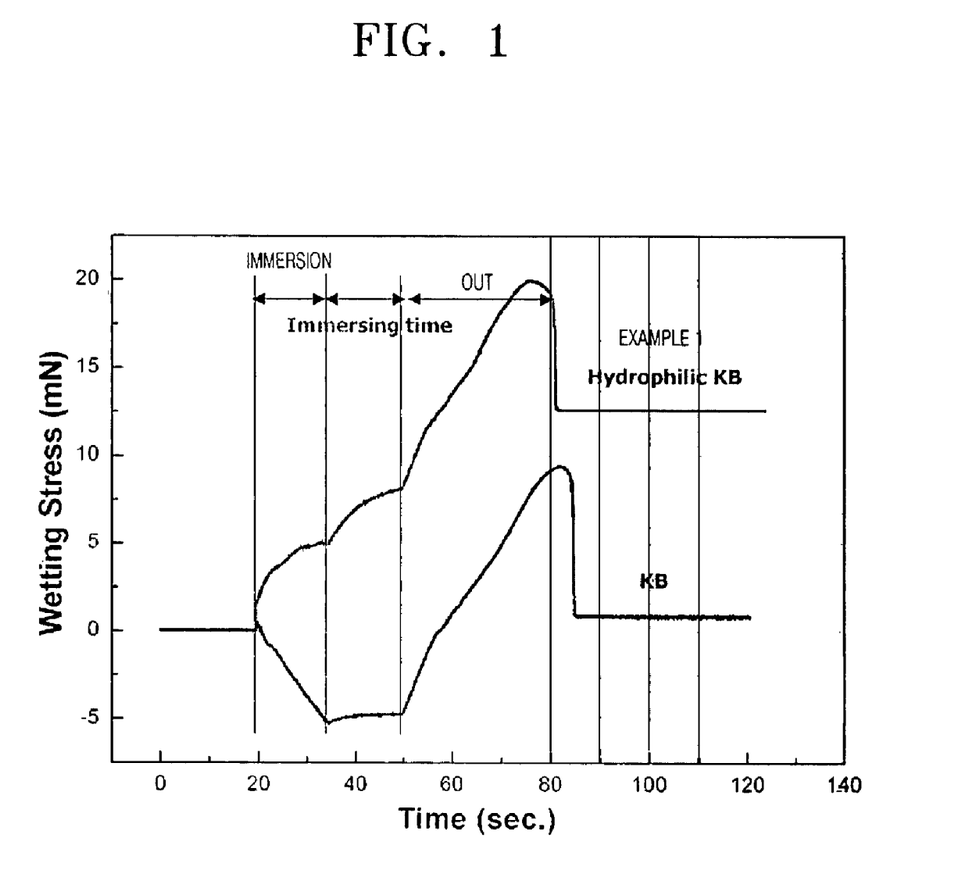
FIG. 1 is a graph illustrating characteristic changes in wetting stress over elapsed time elapsed with respect to an anode of Example 1 of an embodiment of the present invention.

In addition, in the anode according to Example 1, characteristic changes in wetting stress according to the time elapsed were investigated for Ketzen black obtained after an acid treatment and a freeze-drying process and the results are shown in FIG. 1. In FIG. 1, KB* was purchased from Akzo Nobel Polymer Chemicals and used without any treatment and was included in the graph for comparative purposes with the results in Example 1.

Referring to FIG. 1, KB* shows a negative wetting stress due to repulsive force against water when KB* is initially immersed. However, KB obtained after an acid treatment and a freeze-drying process according to Example 1 shows a positive wetting stress straight after it absorbs water indicating no repulsive force against water. Consequently, the resultant KB according to Example 1 greatly improves hydrophilicity.

Figure 2:
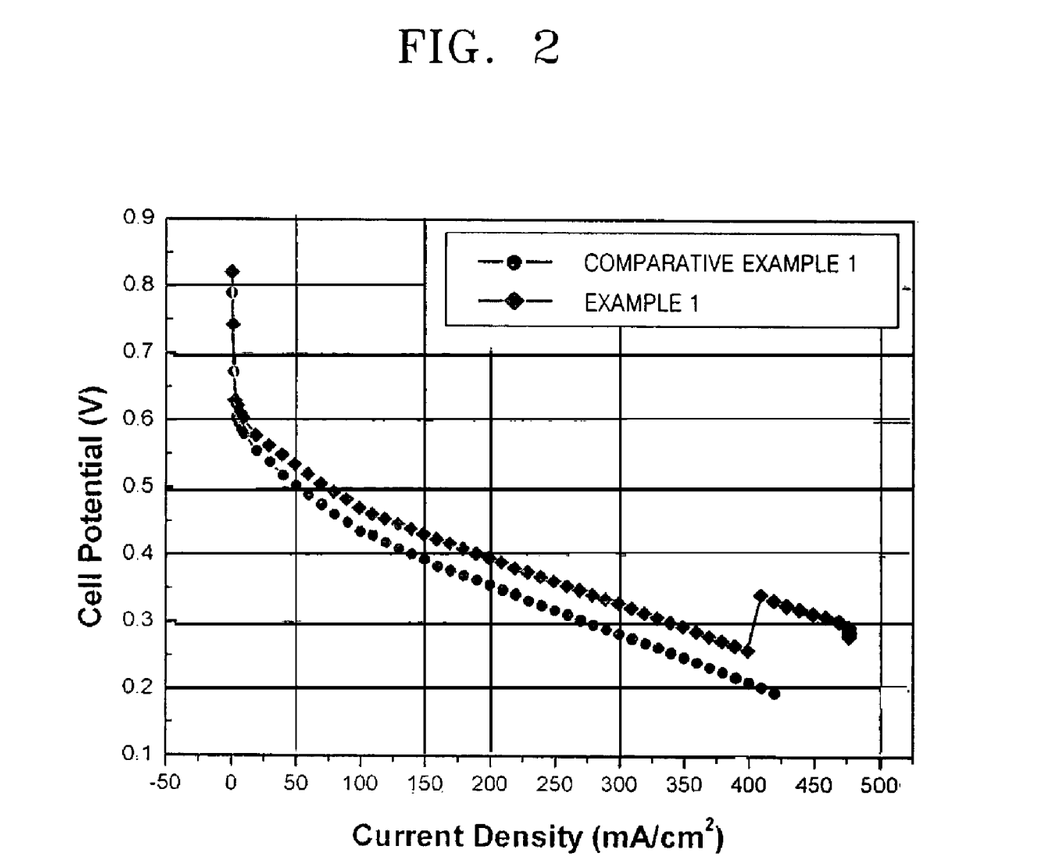
FIG. 2 is a graph illustrating changes in cell potential versus current density with respect to a fuel cell of Example 1 and Comparative Example 1 of an embodiment of the present invention.

Moreover, in the fuel cell according to Example 1 and Comparative Example 1, changes in cell potential versus current density were investigated and the results are shown in FIG. 2. Performance of each fuel cell was measured by flowing 1 M methanol and dry air at 50° C. into the fuel cells.

Referring to FIG. 2, regarding cell potential versus current density curves, the fuel cell in Example 1 shows a higher current density than that of Comparative Example 1 at the same voltage.

Figure 3:
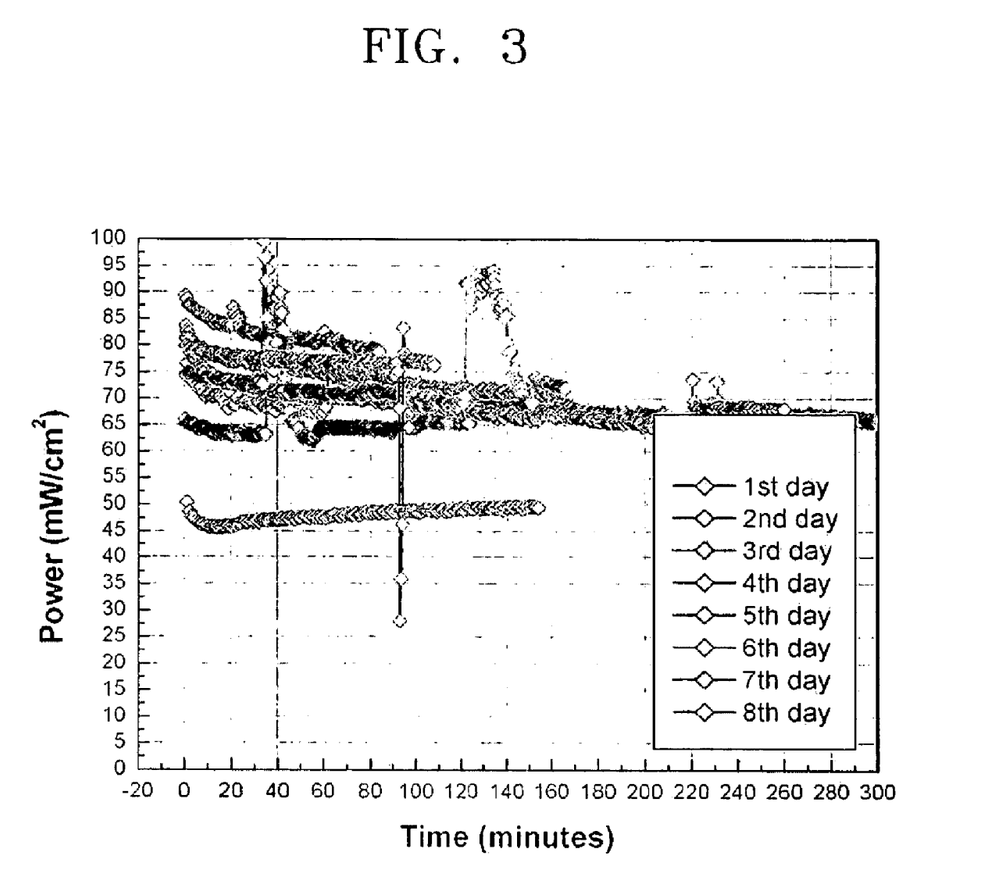
FIGS. 3 and 4 are graphs illustrating power changes over time with respect to a fuel cell of Example 1 and Comparative Example 1, respectively.
Figure 4:
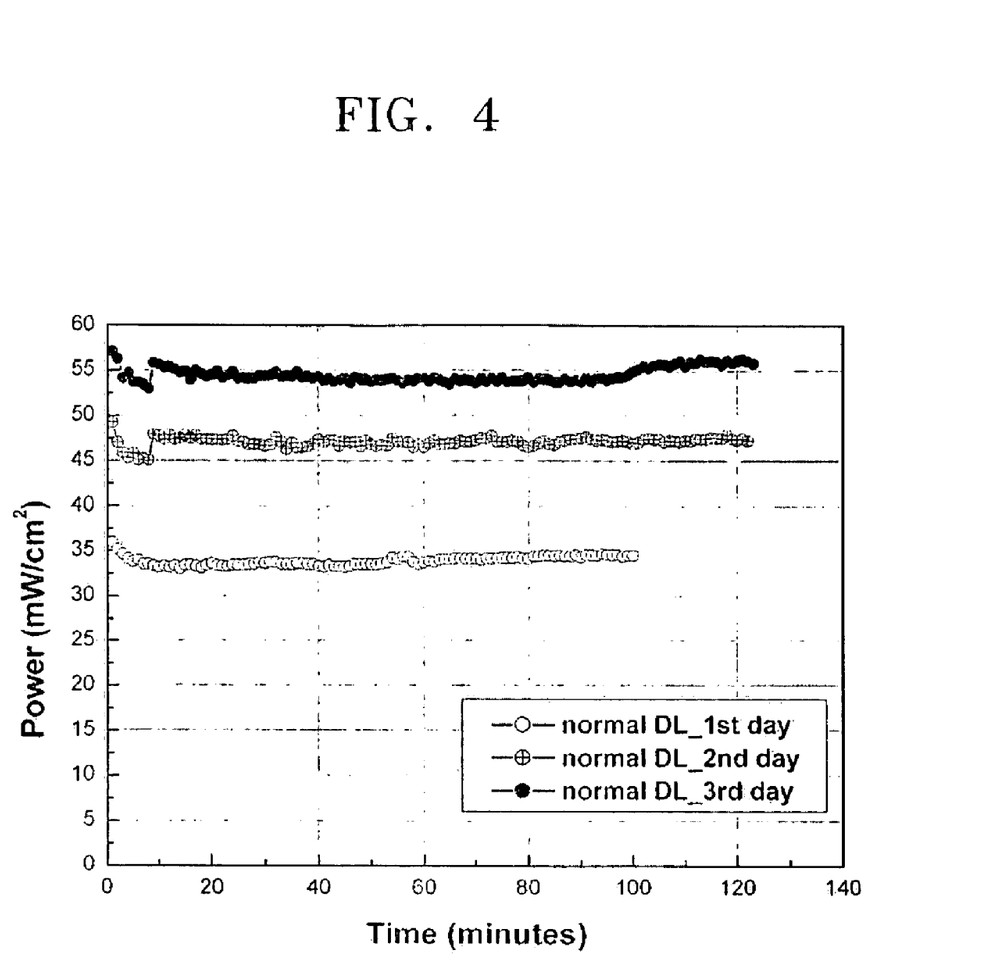

Power changes versus time at a constant voltage of 0.4V were investigated for the fuel cells in Example 1 and Comparative Example 1 and the results are shown in FIGS. 3 and 4, respectively. The performance of each fuel cell was measured by flowing 1 M methanol and dry air at 50° C.

Referring to FIGS. 3 and 4, the fuel cell in Example 1 shows a higher power property than that of Comparative Example 1.

An anode having improved efficiency on liquid fuel diffusion can be obtained when using the fuel diffusion layer including the microporous diffusion layer formed of the carbon-based compounds obtained after an acid treatment and a freeze-drying process according to aspects of the present invention. A fuel cell having improved performance can be manufactured by using such an anode.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An anode for a fuel cell comprising: a fuel diffusion layer and a catalyst layer, the fuel diffusion layer comprising:
   a microporous diffusion layer formed of one or more carbon-based compounds on a porous carbon support, wherein the element analysis values for the carbon-based compounds of the microporous diffusion layer measured using an energy dispersive spectrometer (EDS) are 90.36±2.00 percent by weight for carbon and 9.64±2.00 percent by weight for oxygen.

2. The anode of claim 1, wherein the pH of a slurry of 1 g of the carbon-based compounds in the microporous diffusion layer and 10 cc of deionized water is in a range of 0.1 to 4.1.

3. A fuel cell having the anode of claim 2.

4. The anode of claim 1, wherein the one or more carbon-based compounds is at least one from the group consisting of carbon black, graphite, vitreous carbon, activated charcoal, carbon fiber, activated carbon, carbon aerogel and a mixture thereof.

5. A fuel cell having the anode of claim 4.

6. The anode of claim 1, wherein the catalyst layer comprises at least one metal selected from the group consisting of platinum (Pt) independently and the group consisting of gold, palladium, rhodium, ruthenium, iridium, tin, nickel, and molybdenum, and platinum-alloy or a mixture thereof.

7. A fuel cell having the anode of claim 1.

8. A method of manufacturing an anode for a fuel cell comprising:
   performing an acid treatment of a carbon-based compound;
   washing the resultant obtained from the acid treatment with water and then performing a freeze-drying process to obtain a lyophilized resultant, wherein the element analysis values of the lyophilized resultant measured using an energy dispersive spectrometer (EDS) are 90.36±2.00 percent by weight for carbon and 9.64±2.00 percent by weight for oxygen;
   forming a microporous diffusion layer by dispersing the lyophilized resultant in a solvent, coating the dispersed resultant on a porous carbon support, and drying; and
   forming a catalyst layer on the microporous diffusion layer.

9. The method of claim 8, wherein an acid in an aqueous acid solution used in the acid treatment is at least one selected from the group consisting of nitric acid, sulfuric acid, hydrochloric acid, and acetic acid and an amount of the acid is 0.01 to 50 parts by weight based on 100 parts by weight of the carbon-based compounds.

10. The method of claim 9, wherein a concentration of the aqueous acid solution is 0.1 to 5.0 M.

11. An anode for a fuel cell manufactured according to claim 10.

12. The anode for a fuel cell of claim 11, wherein the element analysis values of the carbon-based compound contained in the anode measured using an energy dispersive spectrometer (EDS) are 90.36±2.00 percent by weight for carbon and 9.64±2.00 percent by weight for oxygen.

13. The anode for a fuel cell of claim 11, wherein the pH of a slurry of a mixture of 1 g of the carbon-based compound contained in the anode and 10 cc of deionized water is in a range of 0.1 to 4.1.

14. An anode for a fuel cell manufactured according to claim 9.

15. The anode for a fuel cell of claim 14, wherein the element analysis values of the carbon-based compound contained in the anode measured using an energy dispersive spectrometer (EDS) are 90.36±2.00 percent by weight for carbon and 9.64±2.00 percent by weight for oxygen.

16. The anode for a fuel cell of claim 14, wherein the pH of a slurry of a mixture of 1 g of the carbon-based compound contained in the anode and 10 cc of deionized water is in a range of 0.1 to 4.1.

17. The method of claim 8, wherein the freeze-drying process comprises:
   a complete freeze-drying in liquid nitrogen; and
   a vacuum drying at −60° C. to −10° C. with a degree of vacuum below 50 mtorr after the complete freeze-drying.

18. An anode for a fuel cell manufactured according to claim 17.

19. The anode for a fuel cell of claim 18, wherein the element analysis values of the carbon-based compound contained in the anode measured using an energy dispersive spectrometer (EDS) are 90.36±2.00 percent by weight for carbon and 9.64±2.00 percent by weight for oxygen.

20. The anode for a fuel cell of claim 18, wherein the pH of a slurry of a mixture of 1 g of the carbon-based compound contained in the anode and 10 cc of deionized water is in a range of 0.1 to 4.1.

21. The method of claim 8, wherein the acid treatment is performed for 1 minute to 200 hours and the freeze-drying process is performed for 5 to 2000 hours.

22. An anode for a fuel cell manufactured according to claim 21.

23. The anode for a fuel cell of claim 22, wherein the element analysis values of the carbon-based compound contained in the anode measured using an energy dispersive spectrometer (EDS) are 90.36±2.00 percent by weight for carbon and 9.64±2.00 percent by weight for oxygen.

24. The anode for a fuel cell of claim 22, wherein the pH of a slurry of a mixture of 1 g of the carbon-based compound contained in the anode and 10 cc of deionized water is in a range of 0.1 to 4.1.

25. The method of claim 8, wherein the carbon-based compound is at least one from the group consisting of carbon black, carbon nanotubes, mesoporous carbon, carbon fiber, and activated carbon.

26. An anode for a fuel cell manufactured according to claim 25.

27. The anode for a fuel cell of claim 26, wherein the element analysis values of the carbon-based compound contained in the anode measured using an energy dispersive spectrometer (EDS) are 90.36±2.00 percent by weight for carbon and 9.64±2.00 percent by weight for oxygen.

28. The anode for a fuel cell of claim 27, wherein the pH of a slurry of a mixture of 1 g of the carbon-based compound contained in the anode and 10 cc of deionized water is in a range of 0.1 to 4.1.

29. The method of claim 8, wherein an applying amount of the carbon-based compound to the porous carbon support is 0.1 to 5 mg/cm$^2$.

30. An anode for a fuel cell manufactured according to claim 29.

31. The anode for a fuel cell of claim 30, wherein the element analysis values of the carbon-based compound contained in the anode measured using an energy dispersive spectrometer (EDS) are 90.36±2.00 percent by weight for carbon and 9.64±2.00 percent by weight for oxygen.

32. The anode for a fuel cell of claim 31, wherein the pH of a slurry of a mixture of 1 g of the carbon-based compound contained in the anode and 10 cc of deionized water is in a range of 0.1 to 4.1.

33. An anode for a fuel cell manufactured according to claim 8.

34. The anode for a fuel cell of claim 33, wherein the element analysis values of the carbon-based compound contained in the anode measured using an energy dispersive spectrometer (EDS) are 90.36±2.00 percent by weight for carbon and 9.64±2.00 percent by weight for oxygen.

35. The anode for a fuel cell of claim 33, wherein the pH of a slurry of a mixture of 1 g of the carbon-based compound contained in the anode and 10 cc of deionized water is in a range of 0.1 to 4.1.

36. An electrode comprising:
a fuel diffusion layer comprising:
a microporous diffusion layer formed of one or more carbon-based compounds on a porous carbon support, wherein the element analysis values for the carbon-based compounds of the microporous diffusion layer measured using an energy dispersive spectrometer (EDS) are 90.36±2.00 percent by weight for carbon and 9.64±2.00 percent by weight for oxygen.

37. A method of manufacturing an electrode comprising:
acid treating a carbon-based compound;
washing the acid treated carbon-based compound with water;
freeze-drying the washed acid treated carbon-based compound, wherein the element analysis values of the freeze-dried compound measured using an energy dispersive spectrometer (EDS) are 90.36±2.00 percent by weight for carbon and 9.64±2.00 percent by weight for oxygen;
dispersing the freeze-dried compound in a solvent to form a slurry; and
coating the slurry on a porous carbon support to form a microporous diffusion layer.

* * * * *